INVENTORS
HANS KREIDEL SEN.
HANS KREIDEL
BY ATTORNEYS

May 19, 1970 H. KREIDEL, SR., ET AL 3,512,812
SEALING RING WITH DIFFERENT SHAPED CUTTING
EDGES FOR PIPE CONNECTIONS
Filed Jan. 30, 1969 2 Sheets-Sheet 2

INVENTORS
HANS KREIDEL SEN.
HANS KREIDEL
BY *[signature]* ATTORNEYS

United States Patent Office 3,512,812
Patented May 19, 1970

---

3,512,812
SEALING RING WITH DIFFERENT SHAPED CUTTING EDGES FOR PIPE CONNECTIONS
Hans Kreidel, Sr., and Hans Kreidel, Wiesbaden, Germany, assignors to Inventex Ltd., a Swiss corporation
Filed Jan. 30, 1969, Ser. No. 795,207
Claims priority, application Germany, Feb. 23, 1968,
1,675,336
Int. Cl. F16l *19/08*
U.S. Cl. 285—341                         2 Claims

ABSTRACT OF THE DISCLOSURE

A sealing sleeve used in a tube connection by insertion on a tube between a connecting nipple and a pressure applying nut. The sleeve has a pair of circular cutting edges each having a different diameter and a concave shaving surface of a different width and different curvature in cross-section with the small diameter cutting edge having a shaving surface of the greater width. The sealing sleeve includes a transition portion having a cylindrical outer surface and a conical inner surface which transition portion is deformed during the formation of a tube connection into a wedge having a trapezoidal cross-section for limiting the penetration of the large diameter cutting edge and indicating the completion of the formation of the connection.

---

BACKGROUND OF THE INVENTION

Field of the invention

This invention relates to a sealing sleeve, particularly one used in connection with a connecting nipple and pressure applying nut to form a tight seal between a connecting nipple and a tube end.

Prior art

The tightness of a connection between a tube and a connecting nipple depends on the amount of material which is raised out of the surface of the tube by a cutting edge of the sealing sleeve. In the formation of connections for tubes that will carry fluid under high pressure, the degree of penetration to form a satisfactory connection in many cases is sufficient to deform the tube radially inwardly. Another problem existing in the high pressure application is that the required depth of the cutting by the cutting edge weakens the tube wall. One solution to the above problems has been the provision of a plurality of cutting edges which simultaneously bite or cut into the outer surface of the tube wall to raise the necessary metal to insure a good seal between the nipple and the tube end. Such a sealing ring is disclosed in the German Pat. No. 834,626. In sealing sleeves which have a plurality of cutting edges which simultaneously bite into the outer surface of the tube or pipe, the resistance to the threading of the pressure applying nut is substantially constant and the operator can not easily determine when a sufficient amount of material has been raised to form a satisfactory connection. To provide an indication of the completion of the formation of the connection, a sealing ring having a plurality of cutting edges which sequentially bite into the tube was proposed and is described in our U.S. Pat. No. 3,402,948.

Since a sealing ring is heat treated to increase the hardness of the cutting edges to be above the hardness of the material of the tube or pipe, a problem has arisen with the sealing ring or sleeve having a plurality of cutting edges. In the sealing sleeve of the prior art, the leading end portion of the sleeve has a thin cross-section and thus the leading end portion becomes completely hardened as the cutting edges are hardened. In the hardened condition, the leading end portion is brittle and may break off during the formation of the connection.

SUMMARY OF THE INVENTION

The present invention provides a sealing sleeve for use in a tube connection in which the sleeve is inserted between a connecting nipple and a pressure applying nut. The sleeve is provided with a pair of circular cutting edges of different diameter, each having a concave shaving surface of a different size and curvature. The cutting edge having the larger shaving surface disposed adjacent the leading end of the sleeve with the cutting edge having the smaller shaving surface spaced inwardly or axially therefrom so that the cutting edges during formation of the connection cut into the tube sequentially with different amounts of penetration. The sleeve is provided with a transition surface adjacent to the rear cutting edge which during formation of the connection is deformed into a trapezoidal wedge cross-section to indicate completion of the formation of the connection and to limit the penetration of the cutting edge having the smaller shaving surface.

Accordingly, an object of the present invention is to provide a sealing ring which exhibits a tightening limit which is apparent to the assembler.

Another object of the present invention is to provide a sealing ring which creates a tight seal between the connecting nipple and the tube without compressing the tube during the connecting operation.

A still further object of the present invention is to provide a sealing ring which creates a tight seal between the tube and the connecting nipple without penetrating into the tube beyond a permissable limit.

Yet another object of the present invention is to provide a sealing ring in which the leading cutting edge is of a size so that the leading end portion is not susceptible to breaking during assembly of the ring on a tube.

Many other features, advantages and additional objects of the present invention will become manifest to those versed in the art upon making reference to the description of the accompanying sheets of drawings in which a preferred structural embodiments covering the present invention is shown by way of illustrative example.

AS SHOWN ON THE DRAWINGS

Figure 1:
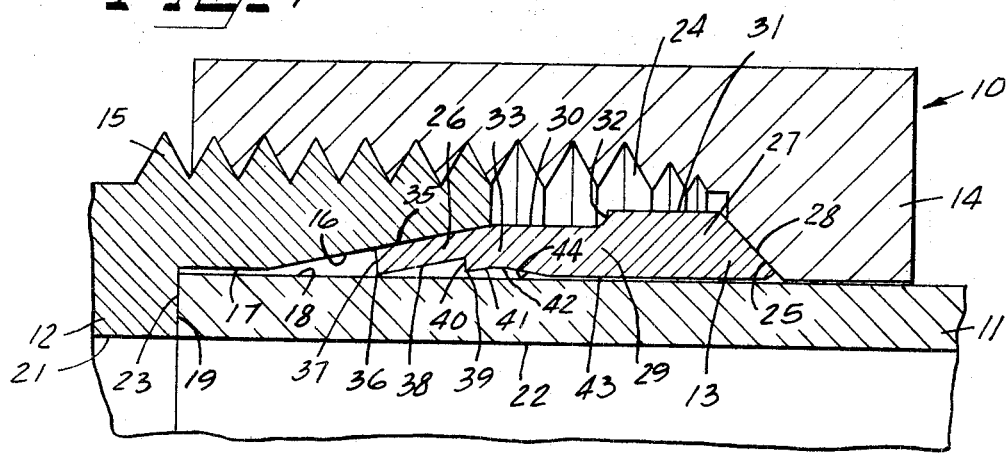
FIG. 1 is a fragmental cross-section of a tube end connection illustrating a sealing sleeve of the present invention prior to the tightening to form the connection.

The principles of the present invention are particularly useful when employed in a tube coupling or connector generally indicated at 10 and illustrated in FIG. 1 as being employed on a pipe or tube end 11. The tube coupling 10 comprises a coupling or connecting nipple 12, a sealing ring or sleeve 13 and a pressure applying nut 14. The coupling nipple 12 has a threaded end 15 which has a conical inner surface 16 which has an included angle of approximately 24°. The inner surface 16 extends into a cylindrical surface 17 which is a diameter larger than the outer surface 18 of the tube end 11. The cylindrical surface 17 is terminated by a shoulder 19 which interconnects the surface 17 with an inner cylindrical surface 21 which has an inner diameter substantially equal to the diameter of the inner surface 22 to the tube 11. When the tube 11 is inserted in the coupling nipple, the end surface 23 of the tube 11 abuts against the shoulder 19 to limit the depth of the insertion.

The pressure applying nut 14 has an internally threaded counterbore at one end to be received on a threaded end 15 of the coupling nipple 12. When threaded together, the nipple 12 and the pressure applying nut 14 form a cavity 24 which receive the sealing ring 13. As illustrated, the pressure applying nut 14 is provided with a conical surface 25 at the base of the threaded counterbore. The pressure applying nut 14 and the connecting nipple 12 are standard items which are commercially available and when threaded together, apply a force on the ring or sleeve 13 to deform and contract it onto the outer surface 18 of the tube or pipe 11.

The sealing sleeve or ring 13 has a leading end portion 26 at one end and a cylindrical portion 27 at the other end which cylindrical portion terminates in a frustoconical surface 28 complementary to the conical surface 25 of the nut 14. Interconnecting the cylindrical portion 27 to the leading end portion 26 is an intermediate portion 29 having a cylindrical outer surface 30 of a smaller diameter than the cylindrical outer surface 31 of the cylindrical portion 27 and the two surfaces 30 and 31 form an external annular shoulder 32 which extends therebetween. The intermediate portion 29 includes a transition portion 33 which is discussed in greater detail hereinbelow.

The leading end portion 26 has a conical outer surface 35 which has an included angle of 24° and is complementary to the conical inner surface 16 of the connecting nipple 12. The leading end portion 26 has a circular cutting edge 36 having a shaving surface 37 at the end thereof. Extending rearwardly from the circular cutting edge 36, the leading end portion 26 has an inner conical surface 38 of the same included angle as the external conical surface 35.

The inner conical surface 38, which is a back surface of the cutting edge 36, is terminated by a second or inner circular cutting edge 39 having an annular shaving surface 40. The cutting edge 39 has a conical back surface 41 of a taper or of an included angle substantially equal to the angle of the conical surfaces 35 and 38. The back surface 41 of the cutting edge 39 extends into a cylindrical surface 42 which is part of the transition portion 33 of the intermediate portion 29. The cylindrical surface 42 has a diameter greater than the diameter of the inner surface 43 of the cylindrical portion 27 and terminates in a converging conical surface 44 which is also part of the transitional portion 33.

Figure 4:
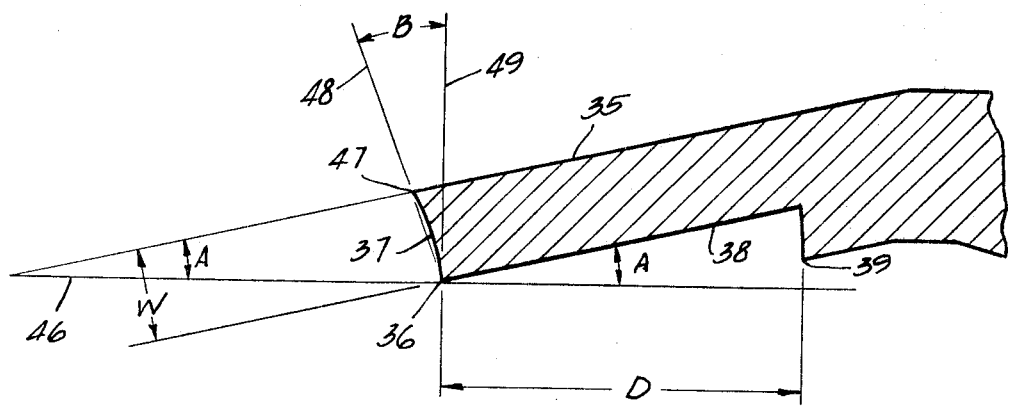
FIG. 4 is an enlarged cross-sectional view of the leading end of the sealing ring of FIG. 1.
Figure 5:
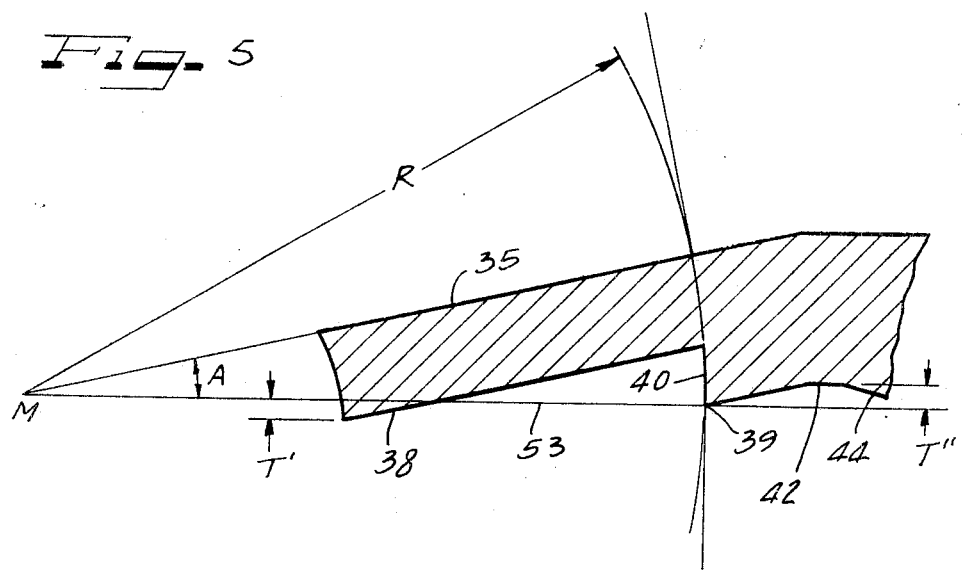
FIG. 5 is an enlarged view of the leading end portion of the sealing ring as illustrated in FIG. 2.

As illustrated in FIGS. 4 and 5, the angles A between the conical surface 35 and 38 and the outer surface of the tube which is represented by the line 46 and is parallel to the axis of the sleeve 13 are equal and substantially 12°. The shaving surface 37 of the leading cutting edge 36 has a concave curvature so that its point of intersection 47 with the external or outer conical surface 35 lies on a line 48 passing through the point 47 and the cutting edge 36 which forms an angle B with a plane 49 which is perpendicular to the axis of the sealing sleeve and the pipe or tube 12. The concave curvature of the shaving surface 37 in cross-section is a circular arc whose radius and center is located such that the angle B is approximately 20°.

As best illustrated in FIG. 5, the shaving surface 40 of the cutting edge 39 is a concave curvature in crosssection lying on a circular arc of a radius R from a center M such that a tangent at the cutting edge 39 is a line lying in a plane perpendicular to the axis of the sealing ring and the tangent at the point of intersection with the outer or external surface 35 is perpendicular to the surface 35. Thus, the center M for the radius R lies at the point of intersection of the extension of the concial surface 35 and a line 53 which passes through the cutting edge 39 and is parallel to the axis of the sleeve 13.

In the preferred embodiment, the width of the shaving surface 40 is two-thirds of the width W of the shaving surface 37. The distance D between the cutting edges 36 and 39, as best illustrated in FIG. 4 is four times the width W of the shaving surface 37.

As illustrated in FIGS. 4 and 5, the diameter of the cutting edge 39 is greater than the diameter of the cutting edge 36 so that the cutting edge 39 will not begin to cut into the exterior surface 18 of the tube until after the cutting edge 36 has penetrated to a depth T'. The diameter of the cylindrical surface 42 is greater than the diameter of the cutting edge 39 so that the difference in their respective radii T" is the amount of penetration that the cutting edge 39 will make the tube 11.

Figure 2:
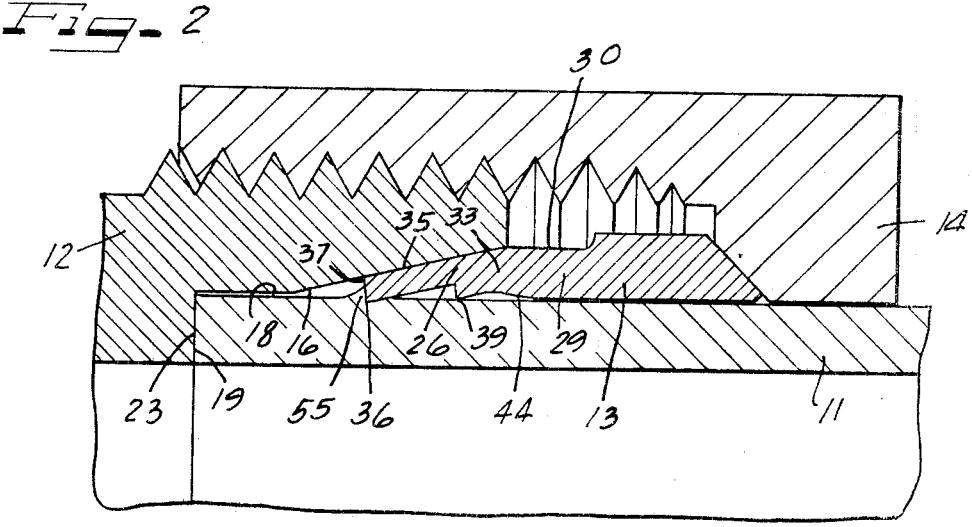
FIG. 2 is a fragmentary cross-section of the same tube connection under completion of approximately one-half of the tightening to form the connection.
Figure 3:
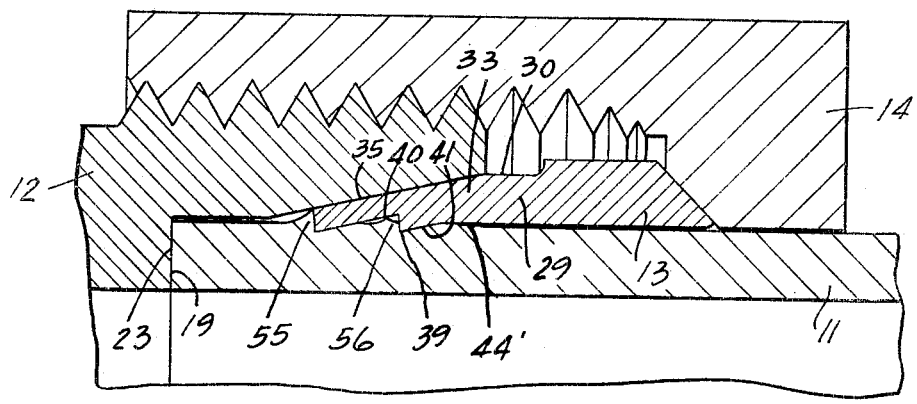
FIG. 3 is a fragmental cross-sectional view of the same tube connection after completion of the tightening or coupling operation.

In forming the connection, the pressure applying nut 14 is threaded onto the coupling nipple 12 to move the sealing ring 13 into the conical surface 16 to radially contract the leading end 26. With the initial contraction of the leading end 26, the cutting edge 36 digs into the outer surface 18 of the tube 11 to urge the end of the tube 23 into tight contact with the internal shoulder 19 of the coupling nipple 12. With continual relative movement, the cutting edge 36 lifts or plows up a ridge of material 55 which is shaped by the shaving surface 37 as best illustrated in FIG. 2.

With continual threading of the pressure applying nut 14 on the connecting nipple 12, the sealing sleeve 13 continues to move so that the leading end portion 26 is continued to be deformed inwardly with the second cutting edge 39 biting into the outer surface 18 of the tube 11 to raise a ridge 56 of material which is shaped by the curved shaving surface 40. During the continued reforming of the leading end while forcing the cutting edge 36 and 39 into the tube wall 18, the cylindrical surface 30 of the intermediate portion 29 is being reformed into an extension of the conical surface 35 of the leading end portion 26 by the conical surface 16 of the connecting nipple 12. The radial pressures applied by reforming the cylindrical surface 30 of the intermediate portion adjacent to the cutting edge 39 causes the conical surface 44 to be collapsed or reformed onto the outer tube surface 18 of the tube 11 as shown at 44'. Thus, the transitional portion 33 is reformed into a wedge having a cross sectional shape that is trapezoidal which wedge extends from the back surface 41 of the cutting edge 39. The trapezoidal shaped wedge of the transition portion 33 along with the ridges 55 and 56 supply an indication to the operator that the formation of the connection is complete. Furthermore, the trapezoidal cross-section shaped wedge along with the ridges 55 and 56 provide a seal between the tube 11 and the sealing sleeve 13 that cooperates with the seal formed by the pressure applied between the shoulder 19 and the tube end 23 to insure a fluid tight connection. The combination of the wedge shaped trapezoidal transition portion 33 with the ridges 55 and 56 provide a seal for a tube connection which is highly resistant to the detrimental effects of vibration which occur in high pressure hydraulic fluid systems.

By increasing the width of the shaving surface 37 of the leading cutting edge 36 over the shaving surface 40 of the rearwardly disposed cutting edge 39, the thickness between the conical external and internal surfaces 35 and 38 has been increased which thickness minimizes the possibility of the leading end portion being detrimentally effected by the heat treatment or hardening process of the sleeve 13. Therefore, the leading end portion of the sleeve is not as brittle and has a greater resistance to being fractured or broken.

Although various minor modifications might be suggested by those versed in the art, it should be understood that we wish to employ within the scope of the patent warranted hereon such embodiments as reasonably and properly come within the scope of our contribution to the art.

We claim as our invention:

1. A sealing sleeve for use in a tube connection comprising a connecting nipple having an internal shoulder for receiving an end of a tube and having a conical inner surface adjacent the shoulder for receiving one end of a sealing sleeve disposed about the outer surface of the tube between the nipple and a pressure applying nut connected on the nipple and engaging said sleeve, said sealing sleeve comprising an annular member having a leading end portion at said one end and a cylindrical portion at the other end, said leading end portion having conical external and internal surfaces and a pair of spaced circular cutting edges of different diameters and cross-sectional configurations disposed on said internal surface, one of said pairs of cutting edges being disposed on the leading end of said leading end portion and the other being spaced inwardly therefrom, said one cutting edge having a diameter smaller than the diameter of the other cutting edge and a shaving surface having a concave curve cross-section of a width greater than the width of the shaving surface of the other cutting edge, said shaving surface of said one cutting edge intersecting said external surface of said leading end portion at a point so that a line extending from said point to said one cutting edge forms an angle of substantially 20° with a plane perpendicular to the axis of said sleeve, and the shaving surface of said other cutting edge having a cross-section of a circular arc of a radius whose tangent at the cutting edge is a line lying in a plane perpendicular to said axis of said sleeve and whose tangent at an intersecting point with said external conical surface is a line perpendicular to said external surface, said leading end portion and said cylindrical end portion being interconnected by a recessed transition portion adjacent a back surface of said other cutting edge and providing a weakening of the sleeve in that area, said transition portion being deformed by the conical surface of the connecting nipple during relative movement between said sleeve and the nipple into a wedge of a trapezoidal cross-section to limit penetration of said pair of cutting edges and relative movement of said sleeve on a tube, so that relative movement between said sleeve and the connecting nipple towards each other contracts said leading end portion radially to cause said one cutting edge to cut into the tube before and penetrate deeper than the other cutting edge until the penetration of both edges is limited by said deformed transition portion.

2. A sealing sleeve according to claim 1, wherein the width of the shaving surface of said other cutting edge is two-thirds of the width of the shaving surface of said one cutting edge, and wherein the distance between said pair of circular cutting edges is four times the width of the shaving surface of said one cutting edge.

References Cited

UNITED STATES PATENTS

| 2,211,856 | 8/1940 | Kreidel | 285—382.7 X |
| 3,011,807 | 12/1961 | Cowdrey | 285—382.7 X |
| 3,120,969 | 2/1964 | Schmohl | 285—382.7 X |
| 3,466,068 | 9/1969 | Kreidel et al. | 285—341 |

FOREIGN PATENTS

| 835,541 | 4/1952 | Germany. |
| 1,168,715 | 4/1964 | Germany. |
| 6,603,680 | 11/1966 | Netherlands. |

THOMAS F. CALLAGHAN, Primary Examiner

U.S. Cl. X.R.

285—382.7